May 25, 1937.  H. C. NISSEN  2,081,762
AUTOMATIC REGULATION FOR ENGINE COOLING MEANS
Filed Sept. 22, 1936  2 Sheets-Sheet 1

INVENTOR.
Harry C. Nissen
BY Harris G. Luther
ATTORNEY

May 25, 1937.  H. C. NISSEN  2,081,762
AUTOMATIC REGULATION FOR ENGINE COOLING MEANS
Filed Sept. 22, 1936  2 Sheets-Sheet 2
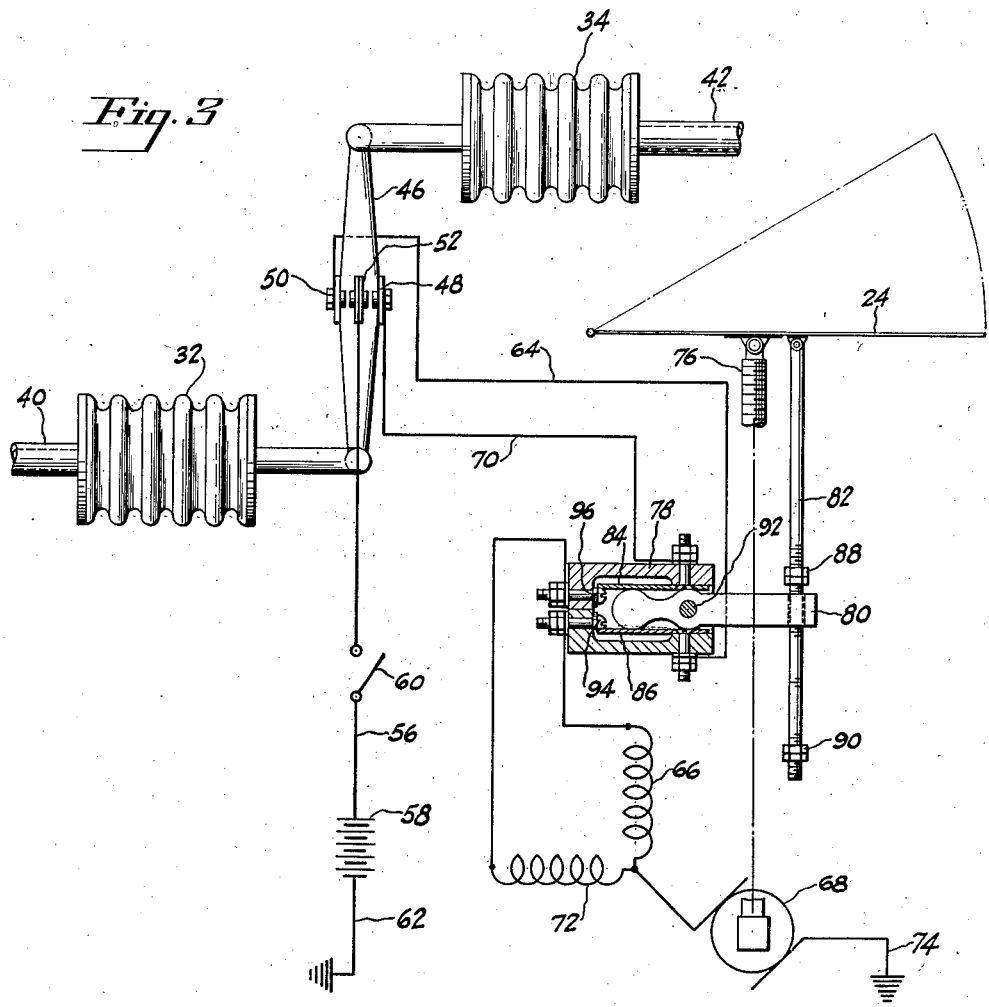
INVENTOR.
*Harry C. Nissen*
BY *Harris G. Luther*
ATTORNEY Patented May 25, 1937

2,081,762

UNITED STATES PATENT OFFICE 2,081,762

AUTOMATIC REGULATION FOR ENGINE COOLING MEANS

Harry C. Nissen, South Glastonbury, Conn., assignor to United Aircraft Corporation, East Hartford, Conn., a corporation of Delaware

REISSUED
JAN 2 - 1940

Application September 22, 1936, Serial No. 101,961

14 Claims. (Cl. 123—178)

This invention relates to improvements in engine cooling means, and has particular reference to cooling means for an air-cooled internal combustion engine such as commonly used for the propulsion of airplanes.

An object of the invention resides in the provision of means for automatically controlling the engine cooling arrangement in accordance with the operating conditions of the engine and the condition of those factors which affect the amount and velocity of cooling air passing through the engine.

A further object of the invention resides in the provision of means for automatically controlling the engine cooling apparatus in accordance with the factors of airplane speed, engine power output, and the temperature of the engine cooling air to provide desired engine temperatures under various engine operating conditions.

A still further object resides in the provision of means in combination with a baffled air-cooled engine inclosed in a drag reducing cowl provided with cowl flaps of means for automatically adjusting the flaps to preserve a ratio between engine temperature and flap induced drag consistent with maximum speed and economy in operation.

Other objects and advantages will be more particularly pointed out hereinafter or will become apparent as the description proceeds.

In the accompanying drawings in which like reference numerals are used to designate similar parts throughout, there is illustrated a suitable mechanical embodiment of what is now considered to be the preferred form of the idea of the invention. The drawings, however, are for the purpose of illustration only and are not to be taken as limiting the invention the scope of which is to be measured entirely by the scope of the appended claims.

In the drawings,

Fig. 3 is a schematic illustration of the cooling controlling mechanism showing the wiring diagrams used for the electrical portion of the device.

Figure 1:
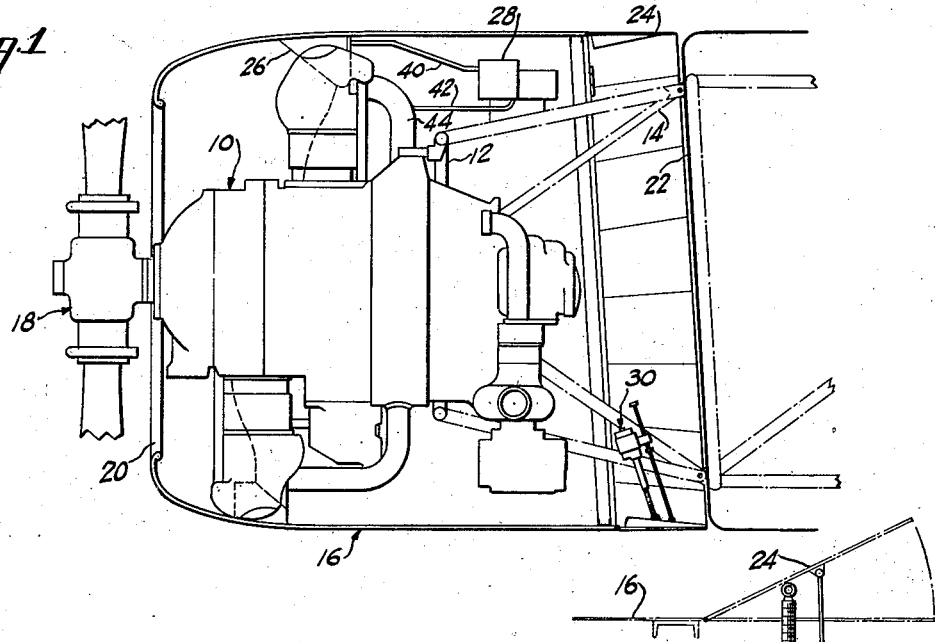
Fig. 1 is a partly schematic elevational view of a radial air-cooled internal combustion engine of the type commonly employed for the propulsion of airplanes, an engine inclosing cowl and cowl flaps being schematically shown in section.

Referring to the drawings in detail, the numeral 10 generally indicates a radial air-cooled internal combustion engine of the type commonly employed for the propulsion of airplanes. It is to be understood, however, that the invention is not limited in its application to an engine of the particular type illustrated but may be applied to various types of air-cooled engines.

The engine in the arrangement illustrated is mounted upon a mounting ring 12 supported upon the vehicle, such as an airplane, by a suitable framework, generally indicated at 14, and is surrounded by an open ended drag reducing ring cowl, generally indicated at 16. In case of an aircraft engine as illustrated, the engine drives a suitable propeller 18 ordinarily carried upon the front end of the engine at the forward end of the airplane. Between the propeller and the engine the cowl 16 is provided with a cooling air inlet opening 20 and at the rear end is provided with a gill opening adjacent to the fire wall 22, the gill opening being controlled by a set of movable trailing edge cowl flaps 24. In line with the engine cylinders there is provided a set of pressure baffles 26 for restricting the flow of engine cooling air through the cowl to the finned cooling surfaces of the engine cylinders.

For a more detailed description of suitable pressure baffles, reference may be had to Patent No. 2,031,541 issued February 18, 1936 to A. L. MacClain, and for a detailed description of a suitable set of cowl trailing edge flaps reference may be had to application Ser. No. 705,094 filed January 3, 1934 by R. B. Beisel and A. L. MacClain.

The baffles 26 are effective to create a pressure differential between the cooling air contained in the compartment within the cowl 16 at the forward or propeller side of the baffles and the air contained in the compartment within the cowl at the rear of the baffles. As the baffles are arranged to radically restrict the flow of cooling air through the engine, a large pressure differential can be built up between the forward and rear cowl compartments, which pressure differential is utilized to create a high velocity in the stream of cooling air flowing along the cooling surfaces of the engine cylinders.

The pressure differential between the forward and rear cowl compartments and consequently, the velocity of the cooling air stream, can be controlled by altering the angular position of the set of cowl flaps 24. Thus when the flaps are open the gill opening between the cowl and the fire wall 22 is increased to provide for a free exit of air from the rear cowl compartment and at the same time an induction effect is created in the air stream flowing over the outside of the cowl which tends to lower the pressure at the rear ends of the cowl flaps and thus impose a partial vacuum upon the rear cowl compartment to materially increase the pressure differential between the forward and rear compartments within the cowl. When the flaps are moved inwardly, the induction effect of the air stream is first decreased, and with continued inward movement of the flaps the induction effect is entirely lost and the gill opening is decreased in area to a degree at which it restricts the flow of cooling air from the rear compartment. Under such conditions, the pressure differential between the forward and rear cowl compartments may be reduced or, in an extreme case, the pressures may be equalized so that little or no cooling of the engine would be accomplished. From the above discussion, it is obvious that the cooling effect upon the engine of the air entering the cowl opening 20 may be controlled within extremely wide limits by varying the angular position of the set of cowl flaps 24. It has been found in practice that the cooling effect of the air stream can be accurately controlled over the entire operating range of the engine to provide the exact amount of cooling consistent with best engine operation and relatively minimum airplane drag at all engine operating conditions.

According to previous practice, the cowl flaps have ordinarily been subject only to manual control so that it has been necessary for the operator of the vehicle to watch the engine temperature indicator and adjust the cowl flaps to obtain the best operating conditions at the temperatures indicated. As explained above, the present invention has for its object the provision of an automatic control for engine cooling through automatic actuation of the cowl flaps to provide a more accurate and consistent relation between engine cooling requirements and the cooling effect produced and to relieve the operator of the vehicle from the additional burden of having to watch the engine temperatures and control the cooling arrangement accordingly.

The objects of the invention are accomplished by the provision of an automatic mechanism, generally indicated at 28, which is made responsive to the power output of the engine and to the pressure differential existing upon the opposite sides of the pressure baffle system 26. This mechanism, in response to the pressure differential and the engine horsepower, controls a suitable device, generally indicated at 30, which is effective to move the cowl flaps 24 to various angular positions and retain them in a desired position for the cooling effect required under all operating conditions. While the device 30 has been illustrated as a reversible electric motor and a screw jack operated thereby, a hydraulic motor or other suitable power operated device is within the scope of the invention.

Figure 2:
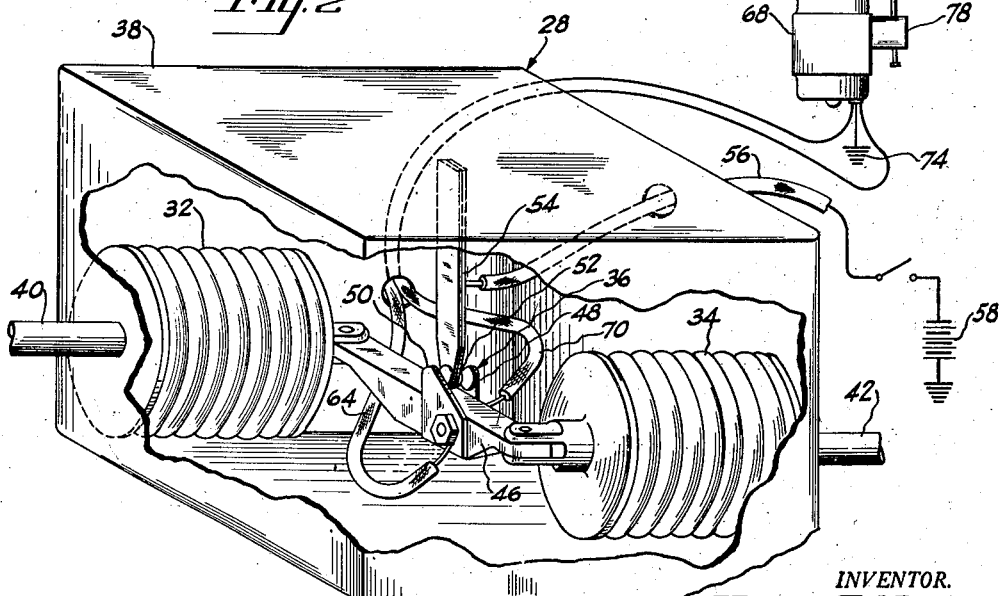
Fig. 2 is a partly schematic perspective view of a mechanism constructed according to the idea of this invention for controlling the cooling of the engine.

The control unit 28 is particularly illustrated in Fig. 2 and includes in general a pair of expansible metal bellows 32 and 34 and an electric contact switch, generally indicated at 36, mounted in a suitable casing 38.

The interior of the bellows 32 is connected by means of a suitable conduit 40 with the forward side of the baffle system 26 to render the bellows 32 responsive to the pressure in the compartment in the forward portion of the engine cowl. The interior of the bellows 34 is connected by a similar conduit 42 with the interior of an engine intake manifold 44 to render the bellows 34 responsive to the horsepower output of the engine. As clearly illustrated in Fig. 2, the bellows 33 and 34 are mounted on opposite ends of the casing 38 so that they project in opposite directions into the interior of the casing. The inner ends of the bellows are spaced apart and are connected together by a pivotally mounted link member or bar 46 which has mounted thereon intermediate its length the electric contact, generally indicated at 36.

The contact 36 is a double contact having two contact elements 48 and 50 carried by the link or bar 46 and an intermediate contact 52 carried upon the free end of a thermostatic element 54 which, in the form of the invention illustrated, is a bi-metallic strip having its end opposite the contact 52 rigidly secured to a side of the casing 38. An electrical conduit 56 leads from one side of a battery 58 to the intermediate contact 52 and includes a manually operable switch 60. The opposite side of the battery 58 is grounded, as indicated at 62. An electrical conduit 64 leads from the contact 50 to one side 66 of the split field of a reversible electric motor 68 and a similar electric conduit 70 leads from the contact 48 to the opposite side 72 of the split motor field. The current can pass from either side of the split motor field to the rotor of the motor in a manner well known in the art and the side of the rotor opposite the field connection is grounded, as indicated at 74, to provide a complete circuit from the battery through the controlling mechanism to ground and through the ground connections back to the battery. It is obvious that, if desired, a third wire system may be substituted for the ground connections schematically illustrated in the accompanying drawings.

The motor 68 is rigidly mounted upon some fixed portion of the engine or airplane, such as the engine supporting frame 14, and is operatively connected with the flap system 24 by suitable means, such as the screw jack 76. The operation of the screw jack is such that when the armature of the motor 68 rotates in one direction the flaps 24 are moved outwardly, and when the motor rotates in the opposite direction the flaps are moved inwardly.

A limit switch 78 is provided to de-energize the appropriate side of the motor field whenever the motor has moved the flaps 24 to a limiting position in either direction. This limit switch, as particularly illustrated in Fig. 3, may conveniently comprise a pivotally mounted lever member 80 having one end associated by means of a lost motion connection with a rod 82 pivotally connected to one of the flaps 24 and having its opposite end in contact at opposite sides thereof with a pair of spring contact members 84 and 86. The lost motion connection between the rod 82 and the lever 80 may conveniently comprise adjustable abutments 88 and 90 which are effective to contact the adjacent side of the end portion of the lever member 80 when the flap 24 has been moved to the respective limiting position. In the form of the device illustrated, when the flap 24 is moved to its outer limiting position, the abutment 90 will contact the lower side of the end portion of the lever member 80 to swing this outer end portion upwardly about the pivot 92 and cause the opposite end of the lever member to bear against the spring contact member 86 and move the contact member away from the respective contact 94, thus breaking the contact between the battery and the side 66 of the split field of the motor 68. Similarly, when the flap 24 has reached its inward limiting position, the abutment 88 contacts the upper side of the end portion of the lever member 80 and causes the lever member to move the spring contact member 84 away from the contact 96, thus breaking the circuit to the side 72 of the split field of the motor 68.

The operation of the device is substantially as follows: the casing 38 is not air-tight and, therefore, subjects the bellows 32 and 34 which it contains to the pressure of the air in the cowl compartment at the rear of the engine. The bellows 32 is thus subject to the pressure differential between the front and rear cowl compartments, the pressure in the front compartment acting on the interior of the bellows, and the pressure on the rear compartment acting upon the exterior. When the pressure in the front compartment is in excess of the pressure in the rear compartment, the bellows 32 tends to expand and move the bar 46 to bring the contacts 50 and 52 together. Bringing the contacts 50 and 52 together completes the circuit through the circuit breaker and through the side 66 of the split field of the motor 68 and rotates the motor in a direction to close the cowl flaps 24.

The bellows 34 is subject exteriorly to the pressure in the rear cowl compartment and interiorly to the pressure in the engine intake manifold. When the engine throttle is partly closed, thereby reducing the pressure in the manifold, the bellows 34 will be contracted so that the contact 50 will be moved toward the contact 52 with the result above stated. If the engine throttle is open, or nearly open, so that the pressure within the intake manifold is high, the bellows 34 will be expanded to move the contact 50 away from the contact 52 and move the contact 48 towards the contact 52 and, under conditions in which the pressure differential affecting the bellows 32 is sufficiently small and the pressure within the intake manifold 44 is sufficiently high, the bar 46 will be moved in a direction to bring the contacts 48 and 52 together. When the contacts 48 and 52 are brought together, the circuit will be completed through the conduit 70, the limit switch 78, and through the side 72 of the split field of the motor 68, causing the motor to rotate in a direction to open the cowl flaps 24. Thus it will be seen that under conditions of a relatively low pressure differential and relatively high engine horsepower output, the device will tend to open the flaps and under the opposite conditions, that is, a relatively high pressure differential and relatively low engine horsepower output, the device will tend to close the cowl flaps. As the device operates upon the resultant effect of the pressure differential and the engine horsepower output, it is also obvious that a condition of either one of these factors alone above or below a predetermined range may be utilized to actuate the mechanism as well as the effect of both factors when acting within a predetermined range.

The effect of the thermostatic element 54, which is responsive to the temperature of the air within the rear compartment, is to move the intermediate contact 52 to compensate the controlling mechanism for variations in the temperature of the cooling air and also to render the device to some extent responsive to the temperature of the engine. Thus if the temperature of the air surrounding the thermostatic element is high, the element will be moved toward the contact 48, thereby rendering it easier for the bellows 32 and 34 to bring the contacts 52 and 48 together, with the result that the control device 28 will cause the flaps to open earlier when the air temperature is high. When the air temperature is low, the thermostatic element will move the contact 52 toward the contact 50, thus delaying the opening of the cowl flaps when the air temperature is low.

The limit switch 78 is effective when the flaps have reached their limiting angular position in either direction to de-energize the side of the split field of the motor tending to rotate the motor in a direction to move the flaps further in that direction but leaving the opposite contact engaged so that upon a reversal of current the motor will be operative to move the flaps toward the opposite position.

While the control device will tend to move the flaps with each change in the values of the pressure differential between the forward and rear flap compartments and the pressure within the intake manifold 54, when the operation of the engine reaches a stable condition, such for instance as in cruising at a constant horsepower, the control device will move the flaps to the appropriate setting for the particular condition and will then tend to maintain the flaps in that position. Sufficient space is provided between the contacts 50, 52, and 48 to provide for minor variations in the conditions upon which the control is based without actuating the control to change the flap setting thus, to a practical degree, eliminating the tendency of the device to "hunt" when conditions are relatively stable. Suitable adjustments may obviously be provided to accommodate the device to various engine and vehicle combinations and to provide for a desired engine operating temperature.

While there has been illustrated and described a particular mechanical arrangement of what is now considered to be the preferred form of the idea of the invention, it is to be understood that the invention is not limited to the construction so illustrated and described but that such changes in the size, shape, and arrangement of parts may be resorted to as come within the scope of the appended claims.

Having now described the invention so that others skilled in the art may clearly understand the same, what it is desired to secure by Letters Patent is as follows.

What is claimed is:

1. In combination with an engine having a plurality of heat radiating cylinders, a cowling inclosing said cylinders, baffles between said cylinders to restrict the flow of cooling air through said engine and create an air pressure differential within said cowl upon opposite sides of said baffles, and movable cowl flaps for controlling the air pressure on the low pressure side of said baffles, power operated means effective to open and close said cowl flaps, and means responsive to the pressure drop across said baffles for controlling said power operating means.

2. In combination with an engine having a plurality of heat radiating cylinders, a cowl inclosing said cylinders, baffles between said cylinders to restrict the flow of cooling air through said engine and create an air pressure differential within said cowl upon opposite sides of said baffles, and movable cowl flaps for controlling the air pressure on the low pressure side of said baffles, power operated means effective to open and close said cowl flaps, and means responsive to the pressure drop across said baffles and to the power output of said engine for controlling said power operated means.

3. In combination with an engine having a plurality of heat radiating cylinders, a cowl inclosing said cylinders, baffles between said cylinders to restrict the flow of cooling air through said engine and create an air pressure differential within said cowl upon opposite sides of said baffles, and movable cowl flaps for controlling the air pressure on the low pressure side of said baffles, power operated means effective to open and close said cowl flaps, and means responsive to the pressure drop across said baffles, to the power output of said engine, and to the temperature of the air passing through said engine for controlling said power operated means.

4. In combination with an air cooled engine, a cowl surrounding said engine, means cooperating with said engine dividing said cowl into a high air pressure chamber and a low air pressure chamber, and means for controlling the cooling of said engine by controlling the air pressure in said low air pressure chamber, means responsive to the pressure difference of the air in said cowl chambers and to the power output of said engine for regulating the cooling of said engine by automatically operating said control means.

5. In combination with an air cooled engine, a cowl surrounding said engine, means cooperating with said engine dividing said cowl into a high air pressure chamber and a low air pressure chamber, and means for controlling the cooling of said engine by controlling the air pressure in said low air pressure chamber, means responsive to the pressure difference of the air in said cowl chambers, to the power output of said engine, and to the temperature of the air passing through said engine for regulating the cooling of said engine by automatically operating said control means.

6. In combination with an air cooled engine, a cowl surrounding said engine, means cooperating with said engine dividing said cowl into a high air pressure chamber and a low air pressure chamber, and means for controlling the cooling of said engine by controlling the air pressure in said low air pressure chamber comprising, power operated means for operating said control means, and means responsive to the pressure difference of the air in said cowl chambers, to the power output of said engine, and to the temperature of the air passing through said engine for regulating the cooling of said engine by actuating said power operated means to automatically operate said control means.

7. In combination with an air cooled engine, a cowl surrounding said engine, means cooperating with said engine dividing said cowl into a high air pressure chamber and a low air pressure chamber, and means for controlling the cooling of said engine by controlling the air pressure in said low air pressure chamber, electrically operated means for operating said control means, and means responsive to the pressure difference of the air in said cowl chambers, to the power output of said engine, and to the temperature of the air passing through said engine for regulating the cooling of said engine by actuating said electrically operated means to automatically operate said control means.

8. In combination with an air cooled engine, a cowl surrounding said engine, means cooperating with said engine dividing said cowl into a high pressure chamber and a low pressure chamber, and means for controlling the cooling of said engine by controlling the air pressure in said low air pressure chamber, power operated means for operating said control means, and means comprising a bellows responsive to the pressure difference of the air in said cowl chambers, and a bellows responsive to the power output of said engine for controlling said power operated means.

9. In combination with an air cooled engine, a cowl surrounding said engine, means cooperating with said engine dividing said cowl into a high air pressure chamber and a low air pressure chamber, and means for controlling the cooling of said engine by controlling the air pressure in said low air pressure chamber comprising, electrically operated means for operating said control means, and means for actuating said electrically operated means, said means including a bellows responsive to the pressure difference of the air in said cowl chambers, a bellows responsive to the power output of said engine, and a switch operated by said bellows for actuating said electrically operated means.

10. In combination with an air cooled engine, a cowl surrounding said engine, means cooperating with said engine dividing said cowl into a high air pressure chamber and a low air pressure chamber, and means for controlling the cooling of said engine by controlling the air pressure in said low air pressure chamber comprising electrically operated means for operating said control means, and means for actuating said electrically operated means, said means comprising a bellows responsive to the pressure difference of the air in said cowl chambers, a bellows responsive to the power output of said engine, a switch operated by said bellows for actuating said electrically operated means, and a thermostatic device responsive to the temperature of the air passing through said engine for affecting the action of said bellows to open or close said switch.

11. In combination with an air cooled engine, a cowl surrounding said engine, means cooperating with said engine dividing said cowl into a high air pressure chamber and a low air pressure chamber, and means for controlling the cooling of said engine by controlling the air pressure in said low air pressure chamber including, a reversible electric motor for operating said control means, and means for actuating said motor comprising a bellows responsive to the pressure difference of the air in said cowl chambers, a bellows responsive to the power output of said engine, a two-pole electric switch operated by said bellows for energizing said motor to rotate in either direction depending upon the conditions of the pressure difference and power output to which said bellows respond, and a thermostatic device responsive to the temperature of the air in said low pressure chamber for modifying the action of said bellows to operate said switch.

12. In combination with an air cooled engine, a cowl surrounding said engine, means cooperating with said engine dividing said cowl into a high air pressure chamber and a low air pressure chamber, and a series of movable cowl flaps for controlling the cooling of said engine by controlling the air pressure in said low air pressure chamber, a reversible electric motor for operating said flaps, and means for actuating said motor comprising an element responsive to the pressure difference of the air in said cowl chambers, an element responsive to the power output of said engine, an element responsive to the temperature of the air in said low air pressure chamber, and a two-pole electric switch operated jointly or independently by said elements to energize said motor to rotate in a direction corresponding to the cooling requirements of said engine.

13. In combination with an air cooled engine, a cowl surrounding said engine, means cooperating with said engine dividing said cowl into a high air pressure chamber and a low air pressure chamber, and a series of movable cowl flaps for controlling the cooling of said engine by controlling the air pressure in said low air pressure chamber, a reversible electric motor for operating said flaps, and means for actuating said motor comprising an element responsive to the pressure difference of the air in said cowl chambers, an element responsive to the power output of said engine, an element responsive to the temperature of the air in said low air pressure chamber, a two-pole electric switch operated jointly or independently by said elements to energize said motor to rotate in a direction corresponding to the cooling requirements of said engine, and a screw jack interposed between said motor and said flaps.

14. In combination with an air cooled engine, a cowl surrounding said engine, means cooperating with said engine dividing said cowl into a high air pressure chamber and a low air pressure chamber, and a series of movable cowl flaps for controlling the cooling of said engine by controlling the air pressure in said low air pressure chamber, a reversible electric motor for operating said flaps, and means for actuating said motor comprising an element responsive to the pressure difference of the air in said cowl chambers, an element responsive to the power output of said engine, an element responsive to the temperature of the air in said low air pressure chamber, a two-pole electric switch operated jointly or independently by said elements to energize said motor to rotate in a direction corresponding to the cooling requirements of said engine, a screw jack interposed between said motor and said flaps, and a limit switch interposed in the circuit between said two-pole switch and said motor for de-energizing said motor to rotate further in the same direction when the cowl flaps have reached their limiting position in either direction.

HARRY C. NISSEN.